United States Patent [19]

Fedeli et al.

[11] Patent Number: 5,821,517
[45] Date of Patent: Oct. 13, 1998

[54] MAGNETIC ENCODER FOR READING MARKS ON AN ASSOCIATED MAGNETIC TRACK

[75] Inventors: Jean-Marc Fedeli, St Martin d'Heres; Miguel Saro, Seyssinet; Line Vieux-Rochaz, Sassenage, all of France

[73] Assignee: Commissariata l'Energie Atomique, Paris, France

[21] Appl. No.: 566,301

[22] Filed: Dec. 1, 1995

[30] Foreign Application Priority Data

Dec. 2, 1994 [FR] France .................................. 94 14536

[51] Int. Cl.⁶ ........................................................ G06K 7/08
[52] U.S. Cl. ............................................ 235/449; 235/440
[58] Field of Search ..................................... 235/449, 440; 360/113

[56] References Cited

U.S. PATENT DOCUMENTS

| | | | |
|---|---|---|---|
| 4,418,372 | 11/1983 | Hayashida | 360/113 |
| 4,639,289 | 1/1987 | Lazzari | 360/122 |
| 4,949,207 | 8/1990 | Lazzari | 360/119 |
| 4,951,166 | 8/1990 | Schewe | 360/119 |
| 4,954,803 | 9/1990 | Iijima et al. | 338/32 R |
| 5,168,408 | 12/1992 | Lazzari . | |
| 5,196,976 | 3/1993 | Lazzari | 360/113 |
| 5,208,716 | 5/1993 | Lazzari . | |
| 5,476,804 | 12/1995 | Lazzari | 438/3 |
| 5,491,606 | 2/1996 | Hesterman et al. | 360/113 |
| 5,504,643 | 4/1996 | Lazzari | 360/113 |
| 5,545,985 | 8/1996 | Campbell | 324/207.21 |

FOREIGN PATENT DOCUMENTS 0 152 326 B1  1/1985  European Pat. Off. .
A-43 09 442   9/1994  Germany .

OTHER PUBLICATIONS

Journal of Applied Physics, vol. 69, No. 8, Part IIB, Apr. 15, 1991, New York, pp. 5408–5410, XP 000240935, Mountfield et al, "Modeling of horizontal magnetoresistive recording heads".

IEEE Translation Journal on Magnetics in Japan, vol. 7, No. 9, Sep. 1992, New York, pp. 705–713, XP 000348906, Ikeda et al, "MR Sensor for Magnetic Encoder".

Primary Examiner—Donald T. Hajec
Assistant Examiner—Mark Tremblay
Attorney, Agent, or Firm—Snell & Wilmer L.L.P.

[57] ABSTRACT

The encoder has at least one magnetoresistor (120, 220, 320, 322, 324, 326) and the magnetic support has a succession of magnetized regions (242, 342, 442), characterized in that the magnetic encoder also has a flux guide (154, 254, 354, 454), which has reading pole pieces (256, 256', 356) separated by at least one air gap (252, 352, 452) having a length (g) less than the smallest spacing of the magnetized regions.

6 Claims, 4 Drawing Sheets

MAGNETIC ENCODER FOR READING MARKS ON AN ASSOCIATED MAGNETIC TRACK

DESCRIPTION

1. Technical Field

The present invention relates to a magnetic encoder for reading marks on an associated magnetic track.

It more particularly relates to an incremental encoder, e.g. for measuring the relative movements between two objects. The invention more especially applies to the fields of robotics and machine tools.

2. Prior Art

For measuring the relative movements between two objects, it is known to perform displacement measurements by means of encoders. These encoders are usually linear encoders or angular encoders having on the one hand a scale rule carried by one of the objects and on the other at least one reader carried by the other object.

The scale rule of the encoder has one or more tracks or channels on which are inscribed graduations, more commonly called marks, which can be of various types and can in particular be magnetic marks.

In general terms, the known encoders can be subdivided into two major groups, namely absolute encoders and incremental encoders. This subdivision of the encoders takes place as a function of the information type each encoder is able to supply. An absolute encoder supplies an information corresponding to the position of the reader on the measuring rule. In addition, each graduation of the rule is marked in a unique manner and cannot be confused with any other graduation. In this case, the reader reads the marking on the rule. An incremental encoder supplies an elementary information whenever the reader/rule position varies by one graduation. In addition, all the graduations carry the same information and, for recognizing displacements between the reader and the rule, it is necessary to count the number of informations read by the reader.

Counting takes place form one or more marks known as "zero cues".

In this connection several magnetic tracks can be provided and e.g. correspond to "zero cue" informations, displacement informations and the displacement direction.

The known magnetic encoders generally have four magnetoresistors generally connected two by two in series in two parallel branches of a measuring bridge of the encoder.

As can be gathered from FIG. 1, the measuring bridge 10 has two branches 12, 14 connected in parallel between a power supply 16 and earth. Magnetoresistors 20, 22 and 24, 26, connected in series, respectively form the branches 12 and 14.

The measuring signal is taken at the terminals 28 and 30, located on the branches 12 and 14 respectively between the magnetoresistors 20, 22 and the magnetoresistors 24, 26. This signal is then supplied to an amplifier of a measurement operation unit 32.

The magnetoresistors are arranged in line and turned towards a track of a magnetic support. FIG. 2 illustrates such a magnetic track and, very diagrammatically, the relative arrangement of the magnetoresistors.

The magnet track 40 has a plurality of successive regions 42 of opposite magnetization, said regions being considered as marks of the magnetic support. The spacing p is used for designating the spatial period e.g. separating the start 44 of a region 42 and the start 44' of a following region 42 having the same magnetization. In the case of the drawing, where the regions all have the same length, the spacing corresponds to the length of two regions 42.

As can be seen in FIG. 2, the magnetoresistors are arranged in such a way that when two of them are in a position where they are traversed by a maximum flux, the two other magnetoresistors are traversed by a minimum flux. In the position shown, the magnetoresistors 20, 26 are in the "maximum" position, i.e. facing a single region 42, and the magnetoresistors 22, 24 in a "minimum" position, i.e. astride two regions 42. A relative movement of the encoder and the magnetic tape by an amplitude p/4 in direction Y reverses this situation.

When the encoder and magnetic tape are put into movement with respect to one another, at the terminals 28, 30 (not shown in FIG. 2), a sinusoidal signal is obtained making it possible to count the linear or rotary displacements as from a reference.

Moreover, a second measuring bridge, identical to that of FIG. 1 with magnetoresistors respectively placed at a distance corresponding to p/8 from those of the first bridge, makes it possible to collect another, time-shifted sinusoidal signal permitting the detection, with respect to the first signal, of the displacement direction of the encoder or the magnetic track.

As stated hereinbefore, the displacements are counted relative to a so-called "zero cue". It is e.g. and as shown in FIG. 3 a magnetic mark 46 on a magnetic track 40. Arrows symbolizing the magnetization show that the mark 46 has a magnetization opposite to that of the remainder of the track 40. During its passage in front of a magnetoresistor MR, the latter supplies a reference signal.

Magnetic encoders of the described type have the advantage of being simple, but do not permit a good measurement resolution. In order to increase the precision of the encoder, one possibility is to reduce the spacing of the magnetic marks, i.e. the spacing of the magnetic regions of the track. However, the reduction in the spacing and therefore the size of these regions, is inevitably accompanied by a reduction of the magnetic flux seen by the magnetoresistor or magnetoresistors.

To compensate the flux reduction, it is also necessary to reduce the distance d (cf. FIG. 2) separating the magnetoresistors from the magnetic track. However, the magnetoresistors have a finite width 1 of approximately 2 $\mu$m.

Thus, as a result of the reduction of the distance d and the spacing p of the regions there is also a spatial resolution loss of the measurement of the magnetoresistors, which are then too wide compared with the spacing, which is contrary to the sought objective.

The difficulty of obtaining a good resolution is also a handicap for producing so-called "zero cue" reference marks.

Therefore one object of the present invention is to propose an encoder with which it is possible to greatly increase the resolution of the measurements.

Another object of the invention is to supply "zero cue" reference signals with a high precision.

DESCRIPTION OF THE INVENTION

The invention makes it possible to achieve these objects by proposing a magnetic encoder for reading marks on an associated magnetic support, the encoder having at least one magnetoresistor and the magnetic support having a succession of magnetized regions arranged along the support, characterized in that the magnetic encoder also has a flux guide for directing a magnetic flux produced by the magnetic support moving relative to the encoder towards the magnetoresistor, said flux guide having reading pole pieces separated by at least one air gap, which has a smaller length than the smallest spacing of the magnetized regions. The pole pieces have ends located at least partly beneath the magnetoresistor, i.e. in a plane between the magnetoresistor and a reading plane of a magnetic support. Therefore the magnetoresistor is located above the air gap.

According to a special aspect of the invention, the magnetic track can have so-called regular magnetized regions arranged with a regular spacing p close to 1, 2×g and at least one so-called reference region located in the succession of regular regions and locally forming a spacing p' greater than p, e.g. approximately p'=1.5 p.

Thus, for a spacing p such that p=1.2 g, the sensor response is minimal.

Thus, the presence of one or more regions with a larger spacing also constitute marks which can serve as a reference for a "zero cue" information.

In order to increase the resolution of the sensor and/or benefit from a "zero cue" signal with a good amplitude, the encoder can have a plurality of so-called active magnetoresistors arranged in linear manner along the magnetic support, the magnetoresistors being equipped with a flux guide having a plurality of air gaps respectively associated with the magnetoresistors and separated pairwise by unequal distances, the magnetic support having a plurality of reference regions, pairwise separated by distances respectively equal to the distances separating the air gaps.

Other features and advantages of the invention can be gathered from the following illustrative and non-limitative description with reference to the drawings.

DETAILED DESCRIPTION OF EMBODIMENTS

Figure 4:
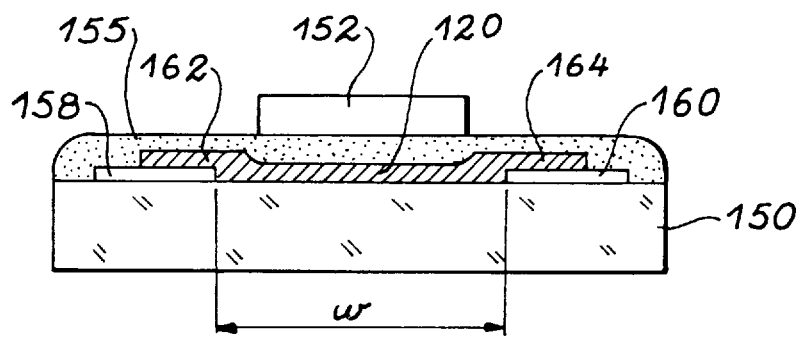
FIG. 4 is a diagrammatic cross-section of an encoder according to the invention.
Figure 5:
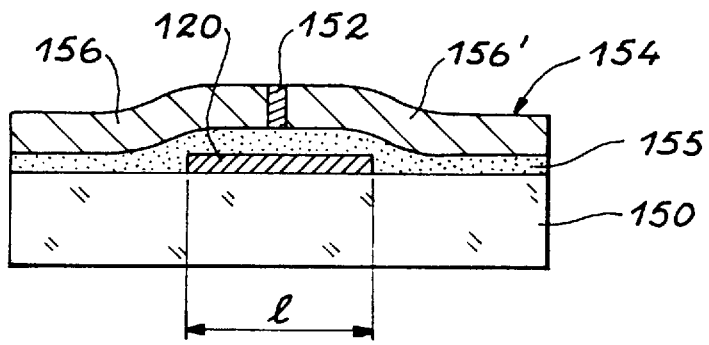
FIG. 5 is a diagrammatic longitudinal section of the encoder of FIG. 4.
Figure 6:
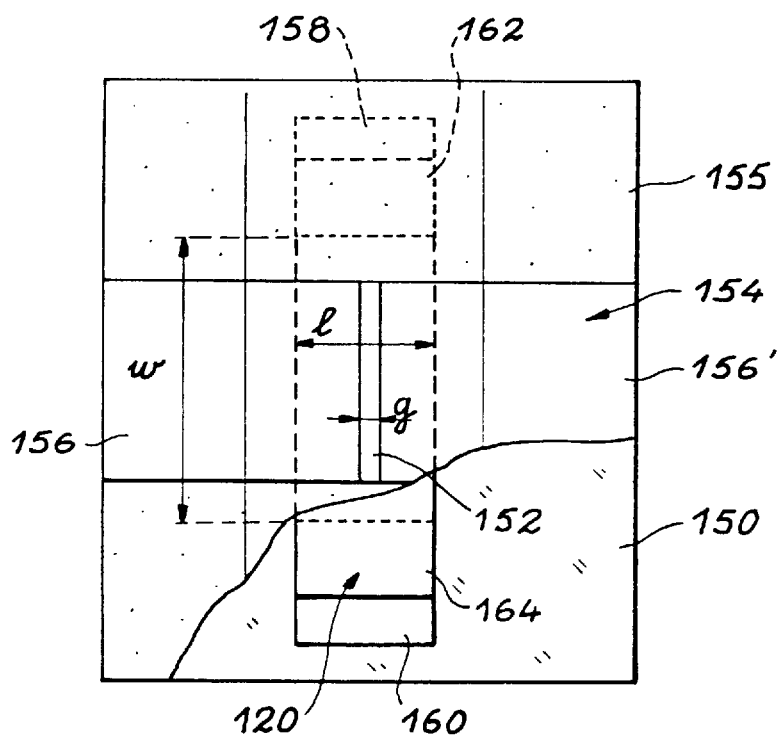
FIG. 6 is a diagrammatic plan view of the encoder of FIG. 4.

FIGS. 4, 5 and 6 show a magnetic encoder according to the invention having a magnetoresistor 120 in the form of a ribbon with an active width w and a length l formed on an insulating substrate 150. It can either be of the monolithic, or of the multilayer type. The width w and length l shown in FIGS. 4, 5 and 6 are respectively measured parallel and perpendicular to the air gap 152 of a flux guide 154 associated with the magnetoresistor.

The air gap 152 of length g separates, as shown in FIGS. 5 and 6, two pole pieces 156, 156' from the flux guide 154, whose ends at least partly overlap the magnetoresistor. The flux guide 154 is electrically insulated from the magnetoresistor by a dielectric material layer 155.

Power points 158, 160 formed on the substrate are connected to the free ends 162, 164 of the magnetoresistor in order to connect it into a not shown circuit. As can be gathered from FIGS. 4 and 6, the ends of the magnetoresistor 162, 164 overlap the power points 158, 160. The power points and the magnetoresistor can be deposited on the substrate using lithography processes. The pole pieces 156, 156' are formed by electrolytic deposition and can undergo grinding in order to render them planar.

For producing the pole pieces and the air gap, it is e.g. possible to use the process described in European patent 125 326. Moreover, French patents 2 645 314 and 2 657 189 illustrate processes for the production of magnetoresistors in applications to magnetic heads.

Figure 7:
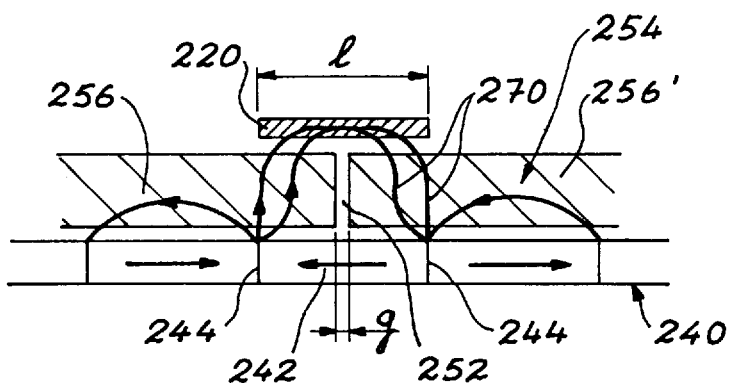
FIG. 7 is a diagrammatic section of an encoder having a single magnetoresistor according to the invention associated with a magnetic support.

FIG. 7 reveals the function of the flux guide. It shows a sensor with a magnetoresistor 220 and a flux guide 254 facing a track of a magnetic support 240 having a succession of regions 242 magnetized in reverse direction.

When the air gap 252 of the flux guide is located between two transitions 244 of regions, as shown in FIG. 7, the magnetoresistor constitutes a short-circuit in the magnetic path formed by the pole pieces 256, 256' of the guide 254. Therefore the flux lines 270 are intercepted or detected by the magnetoresistors. When the air gap 252 is located just above a transition 244, no flux traverses the magnetoresistor.

As a result of the flux guide, it is possible to keep constant the length l of the magnetoresistor at approximately 2 $\mu$m whilst reducing the spacing of the regions of the magnetic track (e.g. p=2 $\mu$m instead of 20 $\mu$m in the prior art). This leads to an improvement in the resolution of the measurements of the encoder.

Figure 8:
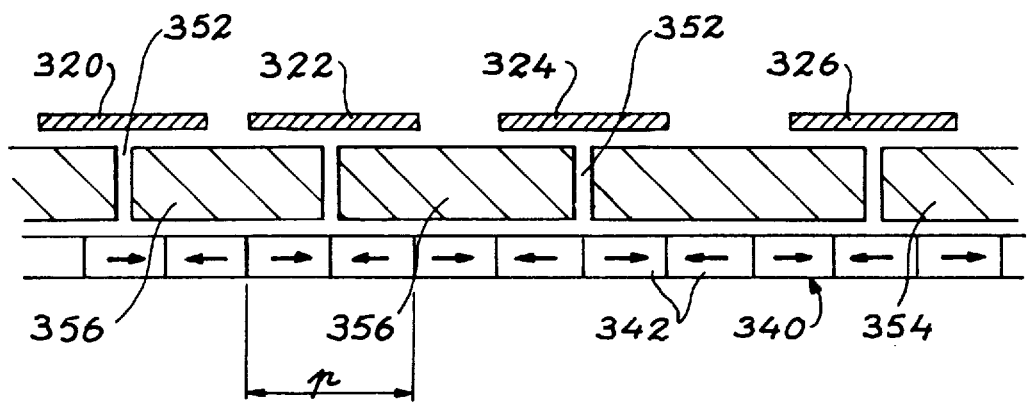
FIG. 8 is a diagrammatic section of an encoder according to the invention with a plurality of magnetoresistors.

In order to implement the counting tracks, as shown in FIG. 8, the encoder can have four active magnetoresistors 320, 322, 324, 326 associated with a flux guide 354 with a plurality of pole pieces 356 forming four air gaps 352 respectively associated with each magnetoresistor. The regions 342 of a magnetic track 340 have a reduced spacing.

Figure 1:
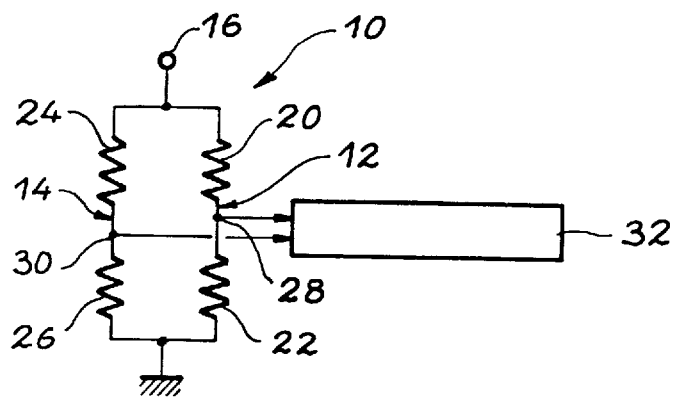
FIG. 1, already described, is a circuit diagram illustrating a cabling detail of a known magnetic encoder.
Figure 2:
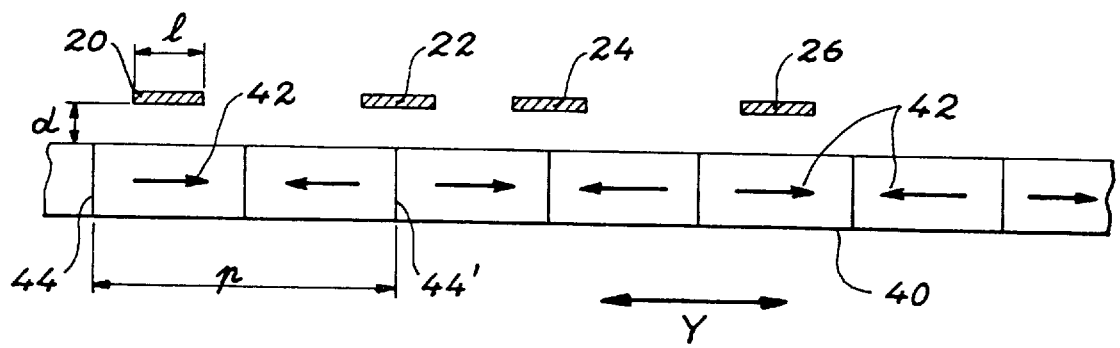
FIG. 2, already described, is a diagrammatic view of a magnetic support and shows the arrangement of the magnetoresistors of the encoder of FIG. 1 with respect to the magnetic track.
Figure 3:
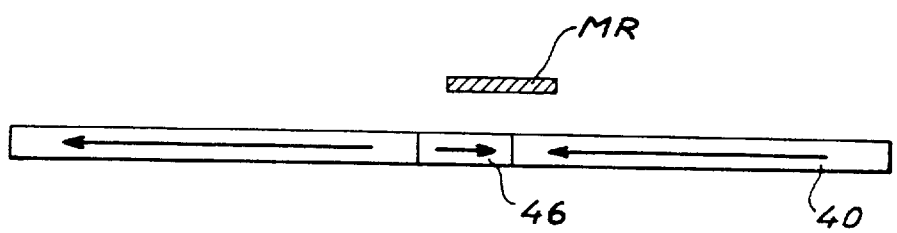
FIG. 3, already described, a diagrammatic view of a magnetic support with a so-called "zero cue" mark of known type.

The different magnetoresistors can be connected in bridge form in accordance with FIG. 1, but respectively replacing 20, 22, 24, 26 by 320, 322, 324, 326 in the case where the regions 342 have a regular spacing.

Figure 9:
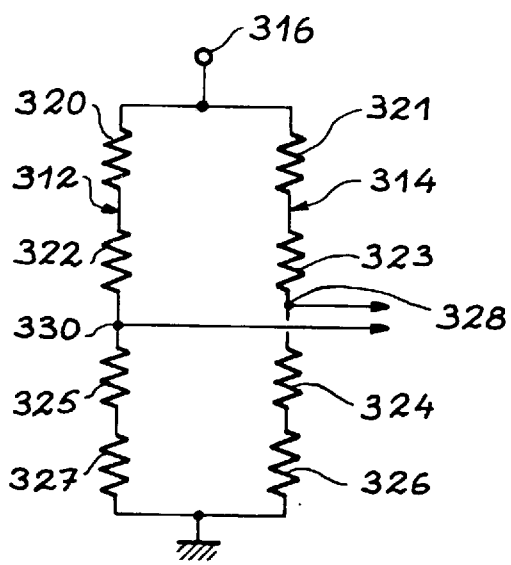
FIG. 9 is a circuit diagram of the cabling of the encoder of FIG. 8, in the particular case of using four magnetoresistors.

For obtaining the zero cue serving as a reference and therefore so as to permit the reading of regions with an irregular spacing, in the manner shown in FIG. 9, the magnetoresistors 320, 322, 324 and 326 are connected in a measuring bridge 310, together with four so-called compensating magnetoresistors 321, 323, 325, 327. The compensating magnetoresistors are insulated against any magnetic flux coming from the magnetic support, but contribute in the measuring bridge connection to the obtaining of an insensitivity to external interference and to the balancing of thermal drifts.

The measuring bridge 310 has two branches 312, 314 connected in parallel between a power supply 316 and earth. The branches 312 and 314 respectively have in sequence the magnetoresistors 320, 322, 325, 327 and the magnetoresistors 321, 323, 324, 326, the latter being respectively connected in series in the bridge branches.

A measuring signal is taken at the terminals 328, 330 on the bridges 312, 314, respectively between the magnetoresistors 322, 325 and between the magnetoresistors 323, 324. The signal is then supplied to a not shown operating unit.

Independently of the fact that the encoder according to the invention has one or more magnetoresistors, as described hereinbefore, the invention not only takes advantage of a flux guide for reducing the spacing of the measuring marks on the magnetic support, but also a size ratio between said spacing and the air gap of the flux guide.

Measurements show that the response of the encoder is no longer dependent on the length l of the magnetoresistor, but instead on the ratio between the length g of the air gap of the flux guide and the spacing p of the regions of the associated magnetic track.

Figure 10:
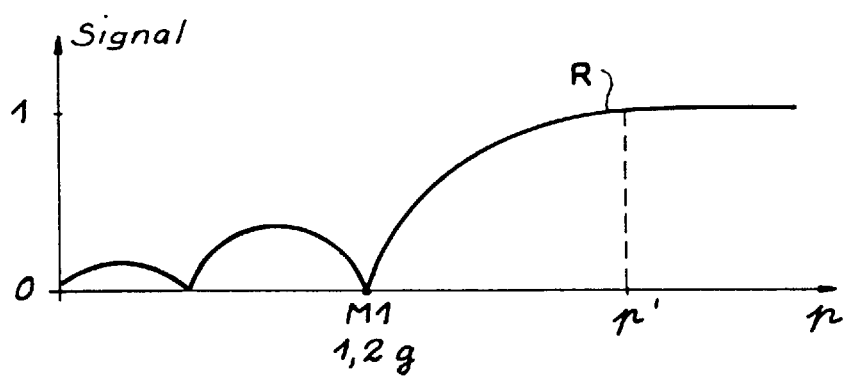
FIG. 10 is a curve illustrating the amplitude of the signal supplied by an encoder according to the invention as a function of the spacing of the magnetized regions of a magnetic support.

Curve R of FIG. 10 shows the amplitude of a signal supplied to the terminals of the encoder as a function of the spacing of the regions of a magnetic track for a flux guide having an air gap of given length g. The amplitude of the signal, plotted on the ordinate is expressed in standardized units. The curve shows that the amplitude of the signal decreases with the spacing in order to reach a first minimum M1 when the spacing p is approximately p≅1.2 g.

It can also be seen that the amplitude of the signal is at a maximum for a spacing value of p'>1.2 g. On taking p=1.2 g, it is experimentally shown that the maximum value p' is approximately 1.5 p.

Advantageously, for obtaining a zero cue mark, one track of the magnetic support can have a succession of regular magnetized regions arranged according to a spacing p close to p=1.2 g, for which virtually no signal is supplied by the encoder and one or more reference regions with a different, larger spacing, whose passage beneath the encoder is detected and constitutes a zero cue mark.

Figure 11:
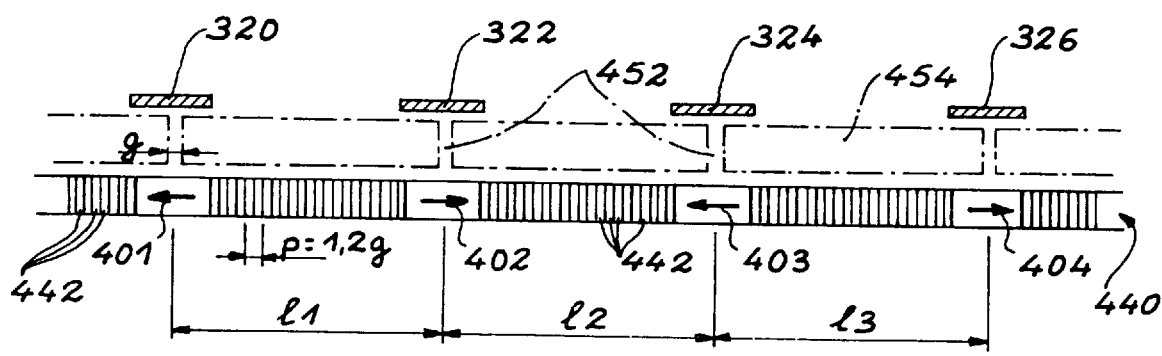
FIG. 11 is a diagrammatic representation of a magnetic track according to the invention.

For a zero cue encoding, as shown in FIG. 11, it is advantageous for the magnetic track to have several reference regions separated by the same distances as the air gaps of the flux guides.

In the present specification, the term distances separating the air gaps, respectively the flux guides, is understood to mean distances considered from center to center of the air gaps or flux guides. Thus, when the reference regions coincide with the air gaps, the four magnetoresistors simultaneously supply a zero cue signal, whose amplitudes are summated.

Figure 12:
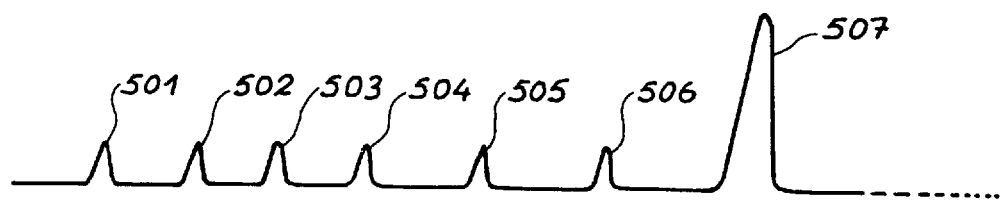
FIG. 12 is a curve indicating the signal supplied by the encoder of FIG. 8 detecting the passage of a track according to FIG. 11.

Such a track 440 is shown in FIG. 11 and has a succession of regular regions 442 arranged with a spacing p such that p≅1.2 g and four reference regions 401, 402, 403 and 404 respectively separated by distances $1_1$, $1_2$ and $1_3$, pairwise different and equal to the distances $1_1$, $1_2$ and $1_3$ separating the air gaps 452 with respect to the flux guide 454 of the magnetoresistors 320, 322, 324, 326. Preferably, the distances $1_1$, $1_2$ and $1_3$ cannot be divided by one another. In other words, each of the distances $1_1$, $1_2$, and $1_3$ is represented by a length measurement and each of the length measurements is a nonmultiple of each of the other length measurements. There will only be one coincidence per passage between all the air gaps 452 and the regions 401, 402, 403, 404. The advantage of such a configuration becomes apparent from studying the curve of FIG. 12, which shows the signal taken on the measuring bridge between the terminals 328 and 330 (FIG. 9) during the passage of the track 440 on the encoder of FIG. 11.

In an example where $1_1$=2, $1_2$=7 and $1_3$=13, table I gives the correspondence between the signals 501 to 507 and the relative position of the track with respect to the air gaps.

TABLE I

| SIGNAL | PASSAGE OF MARK | UNDER AIR GAP OF MAGNETORESISTOR |
| --- | --- | --- |
| 501 | 404 | 320 |
| 502 | 404 | 322 |
| 503 | 403 | 320 |
| 504 | 404 | 324 |
| 505 | 403 | 322 |
| 506 | 402 | 320 |
|  | 401 | 320 |
|  | 402 | 322 |
| 507 | 403 | 324 |
|  | 404 | 326 |

The last line of the table shows that the signal 507 corresponds to the simultaneous coincidence of all the reference regions with the magnetoresistors. As the distances $1_1$, $1_2$ and $1_3$ are pairwise different, this simultaneity only occurs once during the reading of the magnetic track. Moreover, the detection synchronism on the four magnetoresistors of the device gives an amplitude signal which is four times higher and therefore easy to detect.

As a result of these characteristics the resolution of the encoder and the precision of the zero cue mark are also increased.

We claim:

1. A magnetic encoder for reading marks on an associated magnetic support having a magnetic track with a succession of so-called regular magnetized regions arranged with a regular spacing ρ close to 1.2 g and at least one so-called reference region, located in the succession of regular regions and locally forming a spacing ρ' exceeding the spacing ρ, the encoder having at least one magnetoresistor and the magnetic support having a succession of magnetized regions arranged along the support, the magnetic encoder also having a flux guide for directing a magnetic flux, produced by the magnetic support moving with respect to the encoder, to the magnetoresistor, said flux guide having reading pole pieces separated by at least one air gap having a length (g) smaller than the smallest of the magnetized regions and the pole pieces have ends located at least partly between the magnetoresistor and the magnetic support.

2. Encoder according to claim 1, wherein the spacing p' is close to 1.5.p.

3. Encoder according to claim 1 having a plurality of so-called active magnetoresistors arranged in linear manner along the magnetic support, the magnetoresistors being equipped with a flux guide having a plurality of air gaps respectively associated with the magnetoresistors and pairwise separated by unequal distances, the magnetic support having a plurality of reference regions, pairwise separated by distances respectively equal to the distances separating the air gaps.

4. Encoder according to claim 3, wherein the consecutive air gaps are respectively separated by distances, where each of the distances is represented by a length measurement and each of the length measurements is a nonmultiple of each of the other length measurements.

5. Encoder according to claim 3, wherein the magnetoresistors are connected in a detection bridge.

6. Encoder according to claim 5, wherein the bridge has two branches connected in parallel between a power supply and earth with respectively two active reading magnetoresistors and two compensating magnetoresistors connected in series in the branches.

* * * * *